United States Patent
Grubbs

(10) Patent No.: US 9,679,155 B1
(45) Date of Patent: Jun. 13, 2017

(54) PREFIX SEARCH IN ENCRYPTED TEXT

(71) Applicant: Skyhigh Networks, Inc., Campbell, CA (US)

(72) Inventor: Paul Grubbs, Sunnyvale, CA (US)

(73) Assignee: Skyhigh Networks, Inc., Campbell, CA (US)

( * ) Notice: Subject to any disclaimer, the term of this patent is extended or adjusted under 35 U.S.C. 154(b) by 178 days.

(21) Appl. No.: 14/738,473

(22) Filed: Jun. 12, 2015

(51) Int. Cl.
  *H04L 29/06* (2006.01)
  *G06F 21/62* (2013.01)
  *H04L 9/06* (2006.01)
  *G06F 17/30* (2006.01)
  *G06F 12/14* (2006.01)

(52) U.S. Cl.
  CPC .... *G06F 21/6227* (2013.01); *G06F 17/30528* (2013.01); *H04L 9/0618* (2013.01)

(58) Field of Classification Search
  None
  See application file for complete search history.

(56) References Cited

U.S. PATENT DOCUMENTS

| | | | | |
|---|---|---|---|---|
| 8,930,691 B2* | 1/2015 | Kamara | ............ | H04L 9/00 713/165 |
| 9,047,480 B2* | 6/2015 | Kahol | ............ | G06F 21/60 |
| 9,454,673 B1* | 9/2016 | Sarukkai | ............ | G06F 21/6209 |
| 2011/0004607 A1* | 1/2011 | Lokam | ............ | G06F 17/30675 707/759 |
| 2014/0095860 A1* | 4/2014 | Shikfa | ............ | H04L 9/008 713/150 |
| 2015/0178506 A1* | 6/2015 | Elovici | ............ | G06F 21/602 713/189 |

OTHER PUBLICATIONS

Alexandra Boldyreva, Nathan Chenette, Younho Lee and Adam O'Neill, "Order-Preserving Symmetric Encryption," Advances in Cryptology—Eurocrypt 2009 Proceedings, Lecture Notes in Computer Science vol. 5479, pp. 224-241, A. Joux ed., 2009.

* cited by examiner

*Primary Examiner* — Shin-Hon Chen
(74) *Attorney, Agent, or Firm* — Van Pelt, Yi & James LLP

(57) ABSTRACT

A method enables prefix search of cloud stored encrypted files that are encrypted using an order preserving encryption (OPE) algorithm. The encrypted text prefix search method generates a minimum possible plaintext string and a maximum possible plaintext string of the same character length including the search term as the prefix. The minimum and maximum possible plaintext strings are encrypted using the same order preserving encryption algorithm for the encrypted text. The method determines from the minimum ciphertext and the maximum ciphertext a set of common leading digits. The set of common leading digits is used as an OPE encrypted prefix search term and provided to a cloud storage service to search in the cloud stored encrypted files for encrypted text matching the OPE encrypted prefix search term.

14 Claims, 4 Drawing Sheets

PREFIX SEARCH IN ENCRYPTED TEXT

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue. In particular, cloud-based data storage has also come into widespread use. With more and more user data and files being stored in cloud-based data storage, data security for data and files stored on the cloud-based storage data has become an important issue.

BRIEF DESCRIPTION OF THE DRAWINGS

Various embodiments of the invention are disclosed in the following detailed description and the accompanying drawings.

DETAILED DESCRIPTION

Figure 1:
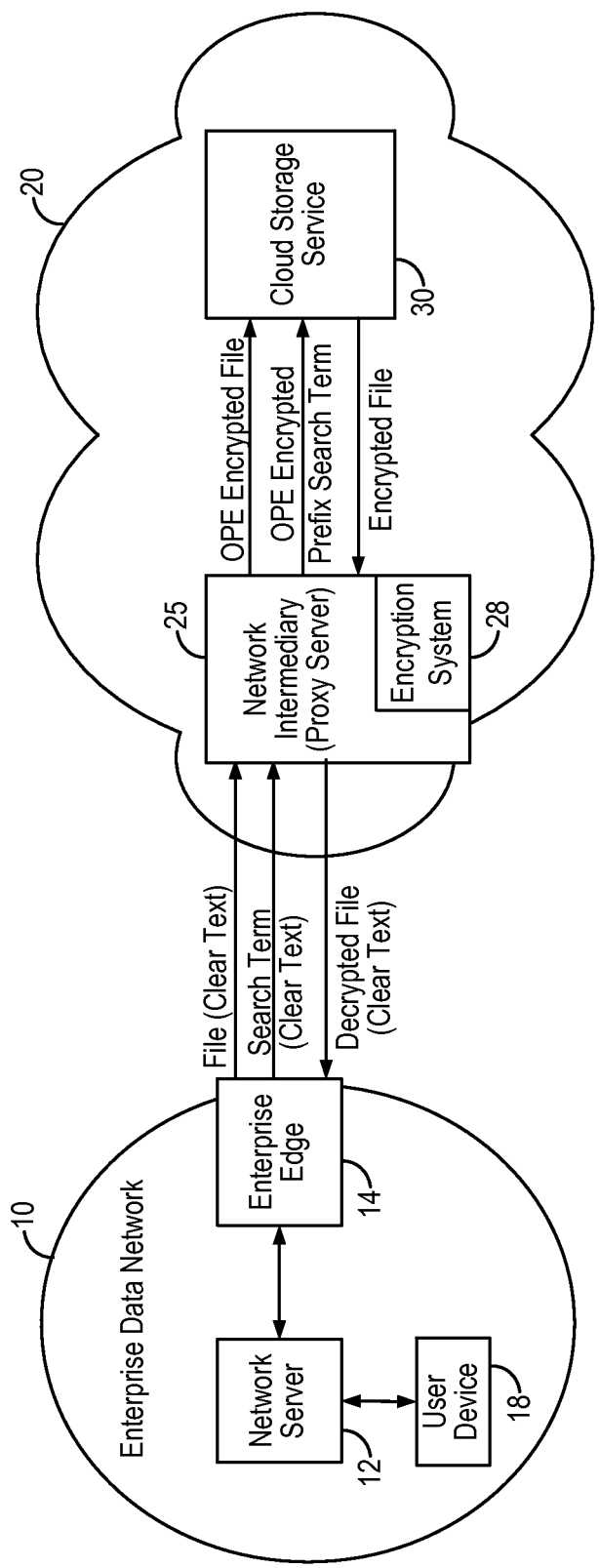
FIG. 1 is a block diagram illustrating a network intermediary implementing encryption of cloud data on behalf of an enterprise in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a method enables prefix search of encrypted text that are encrypted using an order preserving encryption (OPE) algorithm. The encrypted text prefix search method generates based on a search term a minimum possible plaintext string and a maximum possible plaintext string of the same character length including the search term as the prefix. The method determines a common ciphertext prefix string from the OPE encryption of the minimum possible plaintext string and the maximum possible plaintext string. The common ciphertext prefix string is then used to search an encrypted file storage for documents containing the search term as the prefix.

Order-preserving encryption (OPE), also referred to as order-preserving symmetric encryption, is a deterministic encryption scheme using an encryption function that preserves the sort order of the plaintexts. In the present description, sort order refers to the alphabetical or numerical or alpha-numerical ordering of the plaintexts. More specifically, OPE encryption algorithms generate ciphertexts that preserve the sort order of the corresponding plaintexts. When an OPE encryption algorithm is used, encrypted data or ciphertexts stored in a database may be indexed or queried and the database table returns stored encrypted data or ciphertext whose decrypted value fall within the range of the query request.

In general, OPE is a recursive algorithm and may be implemented by sampling a random order-preserving function from a specific domain and range on-the-fly. An example OPE implementation is described in A. Boldyreva, et al., "Order-Preserving Symmetric Encryption," Advances in Cryptology—CRYPTO 2011, $31^{st}$ Annual International Cryptology Conference, P. Rogaway ed., LNCS, Springer, 2011, which reference is incorporated herein by reference in its entirety.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network redirects network traffic between a client device and a cloud-based service through a network intermediary. The client device may be situated within the enterprise data network or be associated with the enterprise. The network intermediary may provide monitoring and assessment of the enterprise's cloud usage. In some cases, the network intermediary is used to provide additional security function, such as file encryption for uploaded data. For instance, the network intermediary may be used to provide encryption of sensitive data to be stored in a cloud service provider.

FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as a cloud service provider 30, that are deployed on the public data network 20. Network traffic from the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of the data before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In the following description, the terms "data," "files," and "documents" will be used interchangeably to refer to the data being encrypted and searched in the network environment described herein. In the present description, references to "data," "files," and "documents" refer to data or files or documents in any format that is being exchanged in the network environment described herein. In some examples, data may be stored in data fields in a structured data application. The use of terms "data," "files," or "documents" is illustrative only and is not intended to limit the present invention to any specific types of data or files being encrypted or searched. In the present example, the cloud-based service 30 may be a cloud storage service, such as Box.com or collaboration services, such as Office 365. The cloud-based service 30 may also be a customer relationship management (CRM) service, information technology (IT) service or other types of cloud services.

In some embodiments, the network intermediary 25 performs encryption of data and files before sending the data and files onto the cloud storage service 30. Accordingly, in some embodiments, the network proxy server 25 includes an encryption system 28 which encrypts and decrypts file content based on one or more encryption algorithms. The content can be a file or list of words from the file. The encryption system 28 may utilize keys, algorithms, pseudo random number generators and encoding algorithms suitable for encrypting the files from the user device. In embodiments of the present invention, the encryption system 28 implements order-preserving encryption using an order-preserving encryption algorithm as described above.

As thus configured, a user in an enterprise data network 10, wishing to use a cloud-based data storage service provider 30 for storing data or files, uses a computing device 18 to access the cloud storage service 30. The user's request is redirected to the network proxy server 25 acting as the network intermediary. The network proxy server 25 may be configured as reverse/forward proxies. Thus, requests and files from the user are intercepted by the network proxy server 25 before reaching the cloud storage service 30. The data or files of the user are sent to the network proxy server 25 in clear text or plaintext. The network proxy server 25 performs, among other things, encryption of the files before sending the encrypted files or data onto the cloud storage service for storage. In this manner, data security is ensured as files are stored on the cloud service provider 30 as encrypted files and any one accessing the files on the cloud service provider directly will only see encrypted text. When the file is to be retrieved from the cloud service provider 30, the network intermediary 25 retrieves the file and also decrypts the file. The decrypted file is then provided to the user device 18 through the enterprise data network 10. With the use of the network intermediary 25 including the encryption system 28, the enterprise makes use of cloud based services with the security of the cloud data and content being encrypted at rest.

While file-level encryption ensures data security, encryption prevents the stored files from being searched using the cloud service provider's native search routine. For example, cloud-based storage services typically provides search option where the stored files can be searched for keywords using the cloud service's native search routine and this search functionality will not work if the files are encrypted.

In embodiments of the present invention, an encrypted text prefix search method is implemented for encrypted files that are encrypted using an order-preserving encryption algorithm. The encrypted text prefix search method enables the prefix searching of OPE encrypted files. In some embodiments, the encrypted text prefix search method is implemented in the encryption system 28 of the proxy server 25. Referring still to FIG. 1, the encryption system 28 receives files or documents in plaintext from the enterprise data network and encrypts the files or documents using an OPE encryption algorithm and forwards the OPE encrypted files to the cloud storage service 30 for storage. When a search of the OPE encrypted files are to be executed, the encrypted text prefix search method receives a search term in plaintext or clear text from a user device 18. The method generates an OPE encrypted prefix search term and provides the search term to the cloud storage service 30. The cloud storage service 30 can then execute a search using the cloud storage service's native search routine based on the OPE encrypted prefix search term. In particular, the cloud storage service will search for encrypted text having a leading string that matches the OPE encrypted prefix search term. When a match is found, the cloud storage service 30 returns the search result to the proxy server 25 and the proxy server 25 provides the search result to the requesting party at the enterprise data network. In some embodiments, the search result can include a listing of the document indexes identifying encrypted files having an encrypted text with a prefix matching the OPE encrypted prefix search term. In other embodiments, the cloud storage service 30 may return the encrypted file as the search result. The method then decrypts the file and provides the decrypted file in clear text to the requesting party at the enterprise data network.

Figure 2:
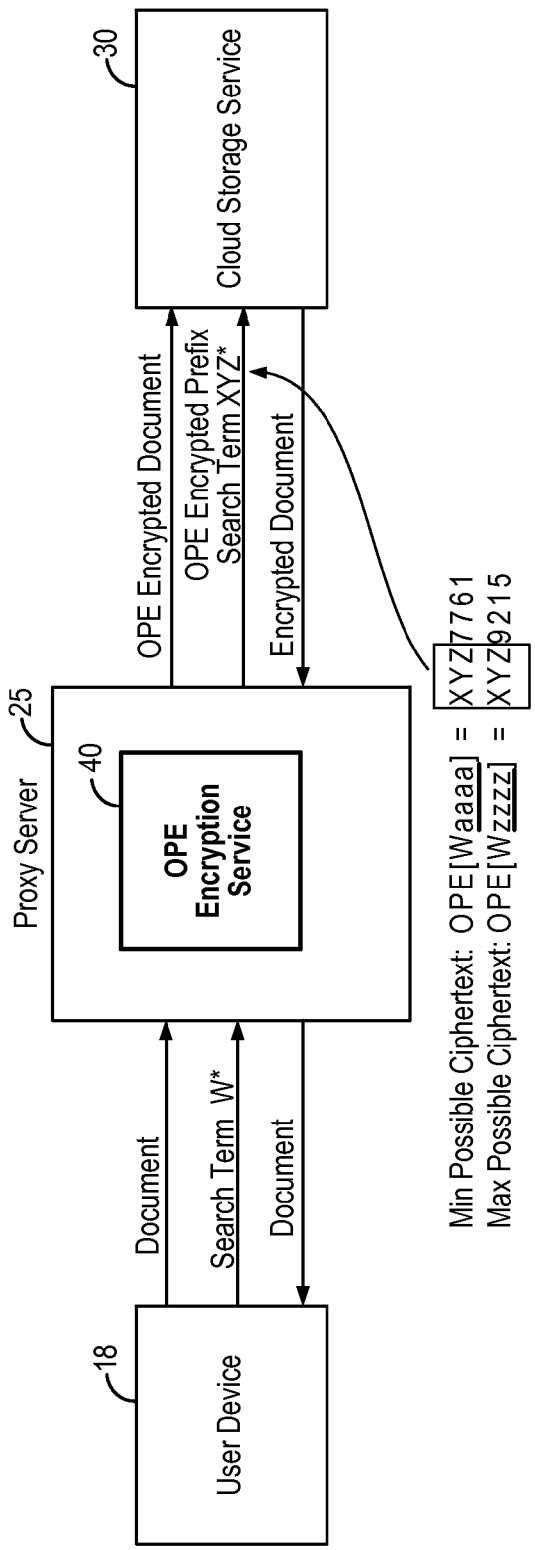
FIG. 2 illustrates the encrypted text prefix search method in embodiments of the present invention.

FIG. 2 illustrates the encrypted text prefix search method in embodiments of the present invention. Referring to FIG. 2, in the present embodiment, the encrypted text prefix search method is implemented in a proxy server 25 serving as a network intermediary between a user device 18 and a cloud storage service 30. The user device 18 may be part of an enterprise data network, as shown in FIG. 1. The enterprise data network is omitted here for simplicity. Files or documents sent by the user device 18 destined to the cloud storage service 30 are intercepted by the proxy server 25. The proxy server includes an OPE encryption service 40 to encrypt files on behalf of the user device so that files or documents are stored on the cloud storage service 30 being encrypted at rest. Furthermore, the OPE encryption service 40 encrypts files using an order-preserving encryption algorithm to preserve the sort order of the encrypted text. In accordance with embodiments of the present invention, the encryption service 40 implements the encrypted text prefix search method of the present invention.

In operation, the user device 18 sends a document to be stored on the cloud storage service 30. The proxy server 25 intercepts the document and passes the document to the encryption service 40 for encryption. The encryption service 40 encrypts the document using an OPE encryption algorithm and sends the OPE encrypted document to the cloud storage service 30 for storage.

When the user wishes to perform a search of the encrypted files stored on the cloud storage service 30, the user device 18 transmits a search term in plaintext and the search term is intercepted by the proxy server 25. The user may wish to perform a prefix search sing a prefix search term "W*" where the user desires to look for files containing the text "W" as the leading string and any characters after the text "W". The encryption service 40 implementing the encrypted text prefix search method of the present invention processes the search term to generate an OPE encrypted prefix search term "XYZ*".

More specifically, the encrypted text prefix search method generates based on the prefix search term a maximum possible plaintext string and a minimum possible plaintext string of the same character length including the search term as the prefix. In particular, two plaintext strings are generated by using the search term as a prefix and padding the search term with trailing characters to a fixed length with a minimum possible search value and a maximum possible search value associated with the search term. In one example, when the search term is a text string using the English alphabet of one or more characters, the search term is padded with trailing characters to a fixed length using the first character of the English alphabet "a" and using the last character of the English alphabet "z" to generate the two plaintext strings. For example, the two plaintext strings can be constructed as "Waaaa" and "Wzzzz". In other examples, when the search term is a numeric string of one or more characters, the search term is padded with trailing characters to a fixed length using the minimum value "0" and using the maximum value "9" to generate the two plaintext strings. For example, the two plaintext strings can be constructed as "P000" and "P999".

In the present description, the search term can include one or more characters of the English alphabet (lower case and uppercase letters), numbers 0-9, punctuation symbols, alphabet and symbols of languages other than English, and other ASCII characters. The encrypted text prefix search method pads the search term with minimum and maximum possible values using the same character type of the search term. For example, when the search term is the English alphabet, the minimum and maximum possible values are based on the first and last letter of the alphabet. In some embodiments, the minimum possible value and the maximum possible value associated with a character type is determined based on the ASCII values assigned to that character type.

With the minimum possible plaintext string and the maximum possible plaintext string thus generated, the encrypted text prefix search method encrypts the two plaintext strings using the same OPE encryption algorithm used to encrypt the stored encrypted files. The OPE encryption generates a minimum possible ciphertext and a maximum possible ciphertext associated with the minimum possible plaintext string and the maximum possible plaintext string. With OPE encryption algorithms, character strings with the same prefix will match to the same location in the ciphertext space so that the resulting ciphertexts will have common leading digits. Accordingly, because the minimum possible plaintext string and the maximum possible plaintext string share the same prefix, the minimum possible ciphertext and the maximum possible ciphertext thus generated will have common leading digits. In the present example, the minimum possible ciphertext is a numeric string of "XYZ7761" while the maximum possible ciphertext is a numeric string of "XYZ9215", where "XYZ" denotes numbers. The minimum possible ciphertext and the maximum possible ciphertext thus share a common leading digits of "XYZ".

The encrypted text prefix search method of the present invention determines a common ciphertext prefix string being the common leading digits from the minimum possible ciphertext and the maximum possible ciphertext. The common ciphertext prefix string is used as the OPE encrypted prefix search term "XYZ*" and is provided to the cloud storage service 30 to perform a prefix search of the encrypted text. The stored encrypted files on the cloud storage service 30 are searched using the native search functionality of cloud storage service for the OPE encrypted prefix search term "XYZ*". When a matching document is found, the cloud storage service 30 returns a search result to the proxy server 25. In some embodiments, the search result can include a listing of the document indexes identifying encrypted files having an encrypted text with a prefix matching the OPE encrypted prefix search term. In other embodiments, the cloud storage service 30 may return the encrypted document as the search result. The encryption service 40 decrypts the document and provides the decrypted document to the user device 18 as the search result.

Figure 3:
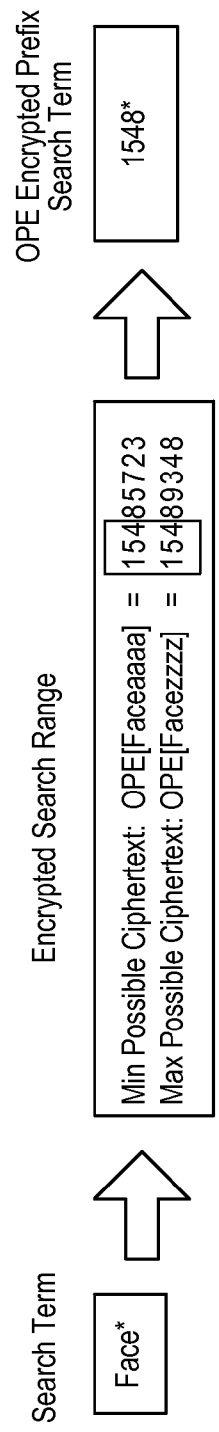
FIG. 3 illustrates one example of the encrypted text prefix search method generating the OPE encrypted prefix search term.

FIG. 3 illustrates one example of the encrypted text prefix search method generating the OPE encrypted prefix search term. In the present example, a plaintext search term "Face*" is received by the encrypted text prefix search method. The search term "Face" is padded with trailing characters to the minimum possible plaintext string "Faceaaaa" and the maximum possible plaintext string "Facezzzz" of the same character length. The minimum possible plaintext string "Faceaaaa" and the maximum possible plaintext string "Facezzzz" are then encrypted using the OPE encryption algorithm to generate the minimum possible ciphertext and the maximum possible ciphertext being numerical strings. In the present example, the minimum possible ciphertext is "15485723" while the maximum possible ciphertext is "15489348". The minimum possible ciphertext and the maximum possible ciphertext share the same common leading digits of "1548". The OPE encrypted prefix search term is thus the common leading digits "1548" and the search term "1584*" can then be used by the cloud service storage to search for the encrypted text containing the word "Face" as prefix in plaintext.

Figure 4:
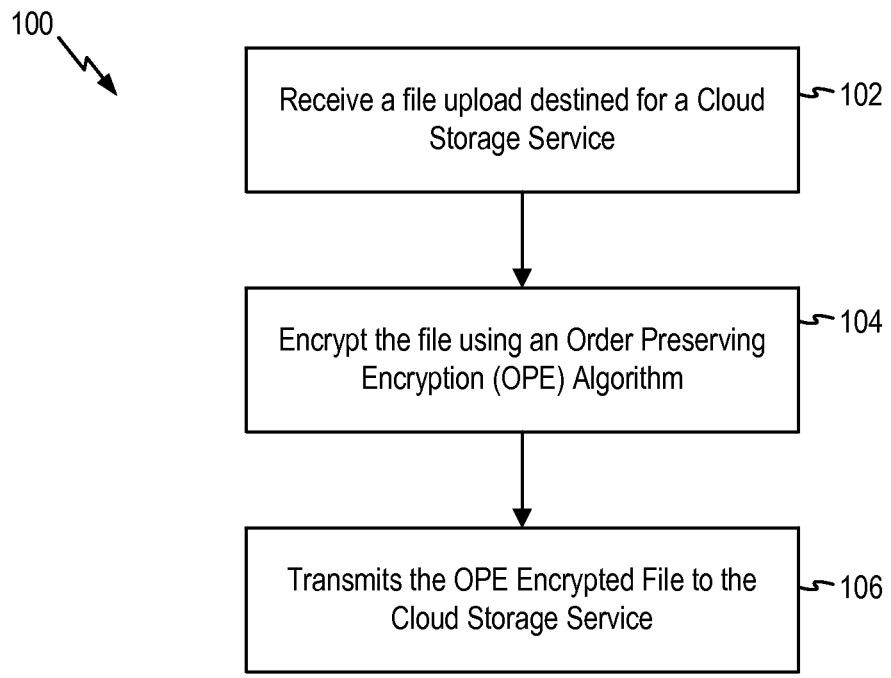
FIG. 4 is a flowchart illustrating a method for OPE encryption of cloud stored data in embodiments of the present invention.

FIG. 4 is a flowchart illustrating a method for OPE encryption of cloud stored data in embodiments of the present invention. The OPE encryption method may be implemented in the network proxy server 25 of FIG. 1 or 2 in embodiments of the present invention. More specifically, in some embodiments, the OPE encryption method may be implemented in the encryption system 28 or the OPE encryption service 40 of the network proxy server 25. Referring to FIG. 4, a method 100 starts when the network proxy server receives a file upload from a user device destined for a cloud storage service (102). For example, the network proxy server may intercept a file upload from a user within an enterprise data network to a cloud storage service. Instead of allowing the user to upload the file directly to the cloud storage service, the file is uploaded to the network proxy server. At the network proxy server, the method 100 encrypts the file using an order-preserving algorithm (104). The method 100 transmits the encrypted file to the cloud storage service 30 for storage (106).

Figure 5:
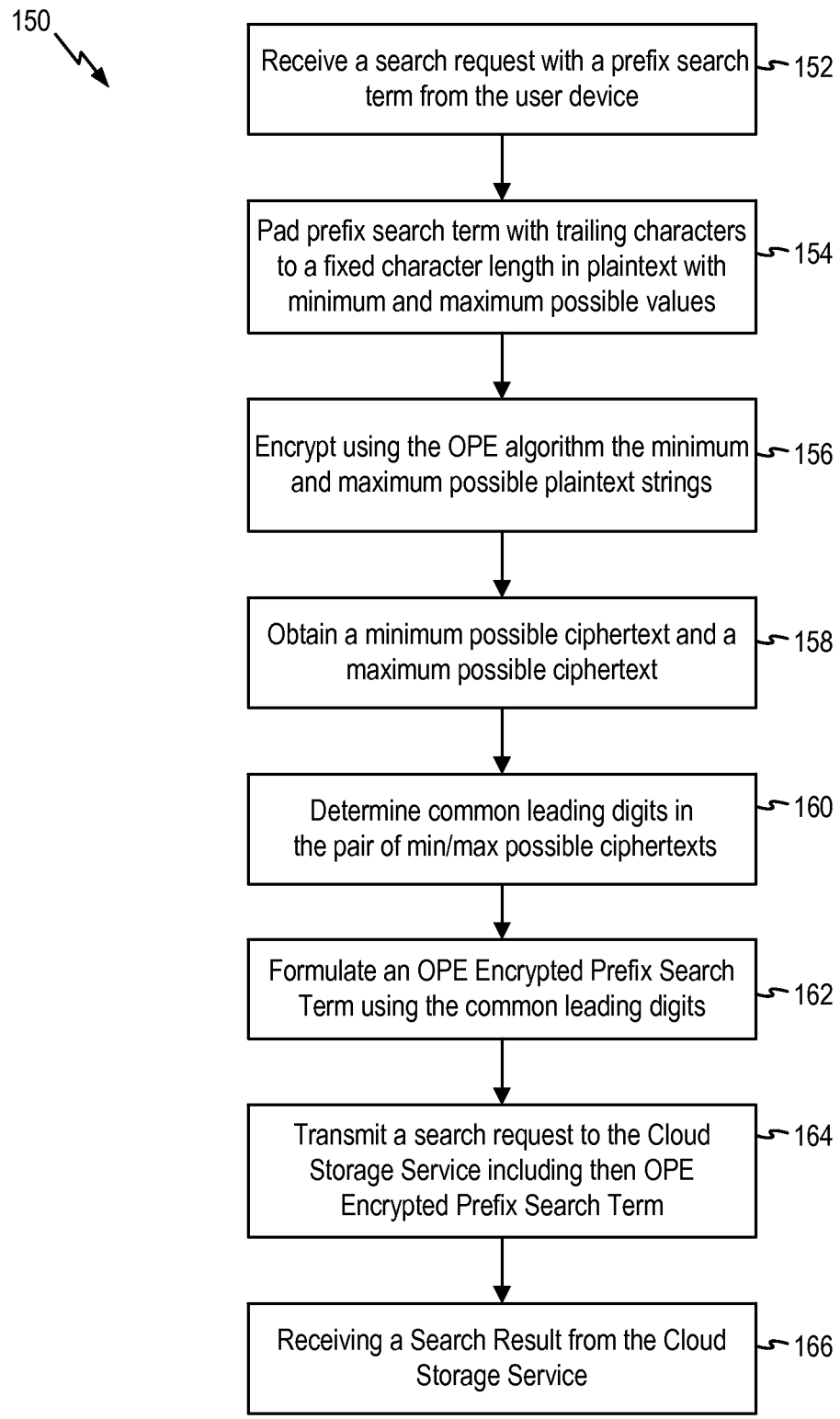
FIG. 5 is a flowchart illustrating the encrypted text prefix search method which may be implemented at the proxy server of FIG. 1 or 2 in embodiments of the present invention.

FIG. 5 is a flowchart illustrating the encrypted text prefix search method which may be implemented at the proxy server of FIG. 1 or 2 in embodiments of the present invention. Referring to FIG. 5, an encrypted text prefix search method 150 receives a search request with a prefix search term at the proxy server 25 from the user device 18 (152). In particular, the user device executes a search request for a file that is stored on the cloud storage service. The user device's search request is intercepted by the network proxy server 25. Accordingly, the search request is received by the method 150 at the network proxy server 25.

The method 150 processes the prefix search term by padding the prefix search term with trailing characters to a fixed character length in plaintext with minimum and maximum possible values (154). The method 150 thus generates a minimum possible plaintext string and a maximum possible plaintext string having the search term as the prefix and having the same character length. The method 150 then encrypts the minimum possible plaintext string and the maximum possible plaintext string using the same OPE algorithm used to encrypt the stored encrypted files (156). As a result of the OPE encryption, a minimum ciphertext and a maximum ciphertext is generated for the minimum possible plaintext string and the maximum possible plaintext string, respectively (158). The method 150 then determines the common leading digits in the minimum and maximum ciphertexts (160). The method 150 then formulates the OPE encrypted prefix search term using the common leading digits in the minimum and maximum ciphertexts (162). The method 150 then transmit the OPE encrypted prefix search term to the cloud storage service as a search request for the encrypted files stored thereon (164). The method 150 receives a search result from the cloud storage service (166).

In some embodiments, in response to the OPE encrypted prefix search term matching the prefix of the encrypted text in one or more of the cloud stored encrypted files, the search result includes a listing of document indexes identifying the one or more encrypted files. The listing of document indices can be provided to the requesting user device and the requesting user device may then retrieve from the cloud storage service one or more of the documents identified by the document indices. The proxy server decrypts the retrieved documents and provides decrypted documents to the requesting user device.

Figure 6:
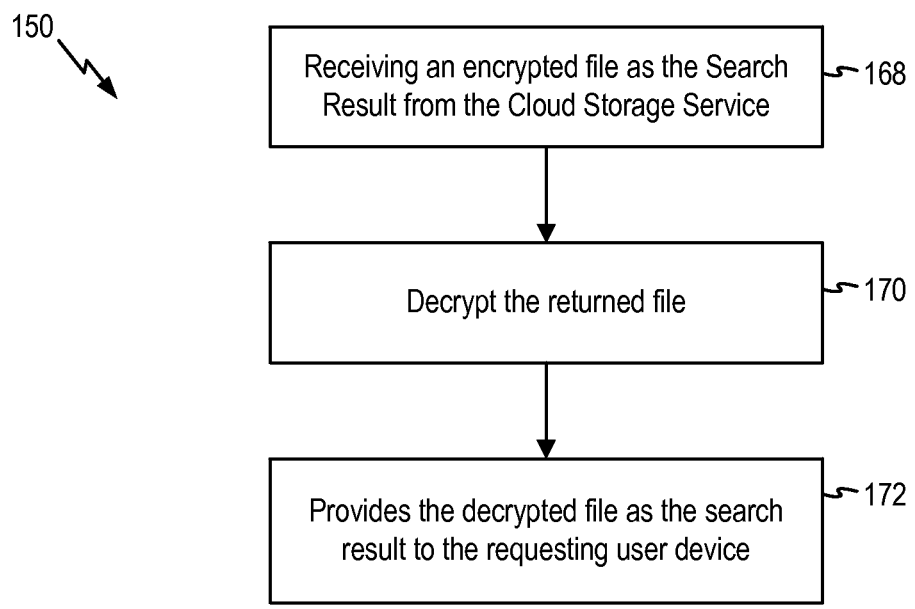
FIG. 6 is a flowchart illustrating additional processing steps in the encrypted text prefix search method in alternate embodiments of the present invention.

In other embodiments, the cloud storage service 30 may return an encrypted document as the search result, as shown in the flowchart in FIG. 6. Referring to FIG. 6, the method 150 may receive one or more encrypted files from the cloud storage service as the search result (168). The method 150 decrypts the one or more returned files (170) and provide the decrypted files to the requesting user device (172).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing prefix search of encrypted cloud stored data comprising:

receiving, at a network intermediary, a search request with a search term directed to encrypted files stored in a cloud storage service, the cloud stored encrypted files being encrypted using an order-preserving encryption algorithm;

generating a minimum possible plaintext string using the search term as prefix and padding the search term to a first character length using one or more trailing characters indicative of a minimum possible value related to the search term;

generating a maximum possible plaintext string using the search term as prefix and padding the search term to the first character length using one or more trailing characters indicative of a maximum possible value related to the search term;

encrypting the minimum possible plaintext string and the maximum possible plaintext string using the order-preserving encryption algorithm used to encrypt the cloud stored encrypted files;

generating a minimum ciphertext from the minimum possible plaintext string and a maximum ciphertext from the maximum possible plaintext string;

determining a set of common leading digits from the minimum ciphertext and the maximum ciphertext;

generating a cloud service search request including the set of common leading digits as an encrypted prefix search term;

sending the cloud service search request with the encrypted prefix search term to the cloud storage service; and receiving a search result from the cloud storage service.

2. The method of claim 1, wherein receiving the search result from the cloud storage service comprises:

receiving the search result including a listing of document indexes identifying one or more encrypted files in the cloud storage service having an encrypted text with a prefix matching the encrypted prefix search term; and providing the search result to a requesting user device.

3. The method of claim 1, wherein receiving the search result from the cloud storage service comprises:

receiving the search result including an encrypted file stored in the cloud storage service having an encrypted text with a prefix matching the encrypted prefix search term;

decrypting the returned encrypted file; and providing the decrypted file as the search result to a requesting user device.

4. The method of claim 1, wherein generating the minimum possible plaintext string using the search term as prefix and padding the search term to the first character length using one or more trailing characters indicative of the minimum possible value related to the search term comprises:

determining the character type of the search term; and padding one or more trailing characters to the search term using the minimum possible value associated with the character type of the search term.

5. The method of claim 4, wherein padding one or more trailing characters to the search term using the minimum possible value associated with the character type of the search term comprises:

padding one or more trailing characters to the search term using the minimum possible value associated with the character type of the search term based on the ASCII values assigned to the character type.

6. The method of claim 1, wherein generating the maximum possible plaintext string using the search term as prefix and padding the search term to the first character length using one or more trailing characters indicative of the maximum possible value related to the search term comprises:

determining the character type of the search term; and padding one or more trailing characters to the search term using the maximum possible value associated with the character type of the search term.

7. The method of claim 6, wherein padding one or more trailing characters to the search term using the maximum possible value associated with the character type of the search term comprises:

padding one or more trailing characters to the search term using the maximum possible value associated with the character type of the search term based on the ASCII values assigned to the character type.

8. A system for performing prefix search of encrypted cloud stored data, comprising:

a network proxy server comprising a computer and configured as a network intermediary between a user device and a cloud storage service storing encrypted files being encrypted using an order-preserving encryption algorithm, the network proxy server being configured to receive a search request with a search term directed to encrypted files stored in a cloud storage service, to generate a minimum possible plaintext string using the search term as prefix and padding the search term to a first character length using one or more trailing characters indicative of a minimum possible value related to the search term, to generate a maximum possible plaintext string using the search term as prefix and padding the search term to the first character length using one or more trailing characters indicative of a maximum possible value related to the search term, to encrypt the minimum possible plaintext string and the maximum possible plaintext string using the order-preserving encryption algorithm used to encrypt the cloud stored encrypted files, to generate a minimum ciphertext from the minimum possible plaintext string and a maximum ciphertext from the maximum possible plaintext string, to determine a set of common leading digits from the minimum ciphertext and the maximum ciphertext, to generate a cloud service search request including the set of common leading digits as an encrypted prefix search term, to send the cloud service search request with the encrypted prefix search term to the cloud storage service, and to receive a search result from the cloud storage service.

9. The system of claim 8, wherein the network proxy server is further configured to receive the search result including a listing of document indexes identifying one or more encrypted files in the cloud storage service having an encrypted text with a prefix matching the encrypted prefix search term and to provide the search result to a requesting user device.

10. The system of claim 8, wherein the network proxy server is further configured to receive the search result including an encrypted file stored in the cloud storage service having an encrypted text with a prefix matching the encrypted prefix search term, to decrypt the returned encrypted file, and to provide the decrypted file as the search result to a requesting user device.

11. The system of claim 8, wherein the network proxy server is further configured to determine the character type of the search term and to pad one or more trailing characters to the search term using the minimum possible value associated with the character type of the search term.

12. The system of claim 11, wherein the network proxy server is further configured to pad one or more trailing characters to the search term using the minimum possible value associated with the character type of the search term based on the ASCII values assigned to the character type.

13. The system of claim 8, wherein the network proxy server is further configured to determine the character type of the search term and to pad one or more trailing characters to the search term using the maximum possible value associated with the character type of the search term.

14. The system of claim 13, wherein the network proxy server is further configured to pad one or more trailing characters to the search term using the maximum possible value associated with the character type of the search term based on the ASCII values assigned to the character type.

\* \* \* \* \*